United States Patent [19]

Gilhousen et al.

[11] Patent Number: 5,697,055
[45] Date of Patent: Dec. 9, 1997

[54] METHOD AND APPARATUS FOR HANDOFF BETWEEN DIFFERENT CELLULAR COMMUNICATIONS SYSTEMS

[75] Inventors: Klein S. Gilhousen, Bozeman, Mont.; Gadi Karmi, La Jolla, Calif.; Edward G. Tiedemann, Jr., San Diego, Calif.; Alejandro Raul Holcman, San Diego, Calif.

[73] Assignee: Qualcomm Incorporated, San Diego, Calif.

[21] Appl. No.: 322,817

[22] Filed: Oct. 16, 1994

[51] Int. Cl.$^6$ ........................... H04Q 7/22
[52] U.S. Cl. ............ 455/33.2; 455/54.1; 379/60; 370/33.2
[58] Field of Search ............... 455/33.1, 33.2, 455/33.4, 34.1, 54.1, 56.1; 379/59, 60; 370/332

[56] References Cited

U.S. PATENT DOCUMENTS

| | | | |
|---|---|---|---|
| 4,901,307 | 2/1990 | Gilhousen et al. | 370/18 |
| 5,063,591 | 11/1991 | Jodoin | 379/60 |
| 5,101,501 | 3/1992 | Gilhousen et al. | 455/33 |
| 5,267,261 | 11/1993 | Blakeney, II et al. | 375/1 |
| 5,295,153 | 3/1994 | Gudmundson | 375/1 |
| 5,594,281 | 1/1997 | Kozdon et al. | 379/60 |
| 5,594,718 | 1/1997 | Weaver, Jr. et al. | 455/33.2 |

FOREIGN PATENT DOCUMENTS

| | | | |
|---|---|---|---|
| 0406186 | 1/1991 | European Pat. Off. | H04Q 7/04 |
| 0421535 | 4/1991 | European Pat. Off. | H04Q 7/04 |

OTHER PUBLICATIONS

TIA document "CDMA Intersystem Operations" by Alejandro Holcman et al. Presented at IEEE Conference on Vehicular Technology Committee, Stockholm, Sweden Jun. 8, 1994.

TIA TR45.2 Intersystems Operations Presentation "The Wideband Spread Spectrum Standard Under Development in TR45.5" by Edward G. Tiedemann, presented in Atlanta, GA, Nov. 16–20, 1992.

TIA document "Intersystem Operation With The Proposed Wideband Spread Spectrum Dual-Mode Mobile Station – Base Station Compatibility Standard" by Gadi Karmi et al, presented May 18, 1992 in Atlanta, GA, pp. 1–37.

TIA Document entitled "Alternative Methods for Inter-Channel Handoff" by Charles Wheatley of QUALCOMM Incorporated, presented on Nov. 10–20, 1992 in Atlanta, Georgia, pp. 1–3.

(List continued on next page.)

*Primary Examiner*—Edward F. Urban
*Attorney, Agent, or Firm*—Russell B. Miller; Sean English

[57] ABSTRACT

A method and system for performing an intersystem handoff of communication with a mobile station between base stations of first and second cellular systems is disclosed herein. At the mobile station, a quantifiable parameter of a signal transmitted by a second base station of the second system is measured. When the measured value of the quantifiable parameter passes through a first predetermined level, the mobile station communicates a signal quality message via a first base station of the first system to a first mobile switching control station. A channel request message is then communicated from the first mobile switching control station to a second mobile switching control station within the second system. At the second base station, a quantifiable parameter of the signal received from the mobile station is also measured. The second base station establishes communication with the mobile station when the measured value of the quantifiable parameter passes through a predetermined level. Alternately, the signal strength of a first pilot signal transmitted by the first base station is measured at the mobile station. A handoff request message is then sent to the second base station when the measured signal strength of the first pilot signal becomes less than a second predetermined level, thereby mobile station communication to be established. The provision of a voice link between the mobile switching control stations allows for the forwarding of an existing connection between the first and second cellular systems, and enables the performance of soft intersystem handoffs.

29 Claims, 4 Drawing Sheets

OTHER PUBLICATIONS

TIA document entitled "Proposed Draft Liaison Statement to TR45.2" by Edward G. Tiedemann, Jr. of QUALCOMM Incorporated presented Dec. 3–11, 1992 in Phoenix, Arizona, pp. 1–32.

TIA Document entitled "Intersystem Issues for Support of the Wideband Spread–Spectrum Digital Standard" by Gadi Karmi of QUALCOMM Incorporated presented Oct. 6, 1992 in Boston, Massachusetts, pp. 1–7.

TIA/EIA Telecommunications Systems Bulletin entitled "Cellular Radiotelecommunications Intersystem Operations: Authentication, Signaling Message Encryption and voice Privacy", May 1993.

EIA/TIA Interim Standard entitled "Cellular Radiotelecommunications Intersystem Operations: Intersystem Handoff", Dec. 1991.

TIA/EIA Telecommunications Systems Bulletin entitled "IS–41–B Mobile Border System Problems", Apr. 1994.

TIA/EIA Telecommunications Systems Bulletin entitled "IS–41–B Support for Dual Mode Wideband Spread Spectrum Mobile Stations", Jan. 1994.

METHOD AND APPARATUS FOR HANDOFF BETWEEN DIFFERENT CELLULAR COMMUNICATIONS SYSTEMS

BACKGROUND OF THE INVENTION

I. Field of the Invention

The present invention relates generally to cellular communications systems in which are disposed multiple base stations. More particularly, the present invention relates to a novel and improved technique for handing off a call or connection between base stations of different cellular systems.

II. Description of the Related Art

The use of code division multiple access (CDMA) modulation techniques is but one of several techniques for facilitating communications in which a large number of system users are present. Although other techniques such as time division multiple access (TDMA), frequency division multiple access (FDMA) and AM modulation schemes such as amplitude companded single sideband (ACSSB) are known, CDMA has significant advantages over these other modulation techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, the disclosure thereof incorporated by reference.

In the just mentioned patent, a multiple access technique is disclosed where a large number of mobile telephone system users, each having a transceiver, communicate through satellite repeaters or terrestrial base stations (also known as cell base stations, or cell-sites) using code division multiple access (CDMA) spread spectrum communication signals. In using CDMA communications, the frequency spectrum can be reused multiple times thus permitting an increase in system user capacity. The use of CDMA techniques results in a much higher spectral efficiency than can be achieved using other multiple access techniques.

In conventional cellular telephone systems the available frequency band is divided into channels typically 30 KHz in bandwidth while analog FM modulation techniques are used. The system service area is divided geographically into cells of varying size. The available frequency channels are divided into sets with each set usually containing an equal number of channels. The frequency sets are assigned to cells in such a way as to minimize the possibility of co-channel interference. For example, consider a system in which there are seven frequency sets and the cells are equal size hexagons. A frequency set used in one cell will not be used in the six nearest or surrounding neighbors of that cell. Furthermore, the frequency set in one cell will not be used in the twelve next nearest neighbors of that cell.

In conventional cellular systems, the handoff scheme implemented is intended to allow a call or other type of connection (i.e., data link) to continue when a mobile station crosses the boundary between two cells. The handoff from one cell to another is initiated when the receiver in the cell base station handling the call or connection notices that the received signal strength from the mobile station falls below a predetermined threshold value. A low signal strength indication implies that the mobile station must be near the cell border. When the signal level falls below the predetermined threshold value, the base station asks the system controller to determine whether a neighboring base station receives the mobile station signal with better signal strength than the current base station.

The system controller in response to the current base station inquiry sends messages to the neighboring base stations with a handoff request. The base stations neighboring the current base station employ special scanning receivers which look for the signal from the mobile station on the specified channel. Should one of the neighboring base stations report an adequate signal level to the system controller, then a handoff will be attempted.

Handoff is then initiated when an idle channel from the channel set used in the new base station is selected. A control message is sent to the mobile station commanding it to switch from the current channel to the new channel. At the same time, the system controller switches the call from the first base station to the second base station.

In the conventional system a call will be discontinued if the handoff to the new base station is unsuccessful. There are many reasons that a failure in handoff may occur. Handoff can fail if there is no idle channel available in the neighboring cell for communicating the call. Handoff can also fail if another base station reports hearing the mobile station in question, when in fact this base station actually hears a different mobile station using the same channel in a completely different cell. This reporting error will result in the call being switched to a wrong cell, typically one in which signal strength is insufficient to maintain communications. Furthermore should the mobile station fail to hear the command to switch channels, the handoff will fail. Actual operating experience indicates that handoff failures occur frequently which questions the reliability of the system.

Another common problem in the conventional telephone system occurs when the mobile station is near the border between two cells. In this situation the signal level tends to fluctuate at both base stations. This signal level fluctuation results in a "ping-ponging" situation in which repeated requests are made to hand the call back and forth between the two base stations. Such additional unnecessary handoff requests increase the possibility of the mobile station incorrectly hearing the channel switch command or failing to hear the command at all. Furthermore, the ping-ponging situation raises the possibility that the call will be discontinued if it is inadvertently transferred to a cell in which all channels are currently in use and thus unavailable for accepting the handoff.

In U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM", issued Mar. 31, 1992, assigned to the assignee of the present invention, a method and system are disclosed for providing communication with the mobile station through more than one cell base station during the handoff. In this environment communication within the cellular system is uninterrupted by the eventual handoff from the base station corresponding to the cell from which the mobile station is exiting to the base station corresponding to the cell to which the mobile station is entering. This type of handoff may be considered as a "soft" handoff in communications between cell base stations with the mobile wherein two or more base station or sectors of base station transmit concurrently to the mobile station. The use of such "soft" handoff techniques has been found to substantially reduce the incidence of ping-ponging situations in which repeated handoff requests are made between a pair of base stations.

An improved soft handoff technique is disclosed within U.S. Pat. No. 5,267,261, entitled "MOBILE STATION ASSISTED SOFT HANDOFF IN A CDMA CELLULAR COMMUNICATIONS SYSTEM", issued Nov. 30, 1993, hereinafter referred to as the '261 patent, which is also assigned to the assignee of the present invention. In the system of the '261 patent, the soft handoff process is improved by measuring at the mobile station the strength of "pilot" signals transmitted by each base station within the system. These pilot strength measurements are of assistance in the soft handoff process by facilitating identification of viable base station handoff candidates.

More specifically, the system of the '261 patent prescribes that the mobile station monitor the signal strength of pilots from neighboring base stations. When the measured signal strength exceeds a given threshold, the mobile station sends a signal strength message to a system controller via the base station through which the mobile station is communicating. Command messages from the system controller to a new base station and to the mobile station establish contemporaneous communication through the new and current base stations. When the mobile station detects that signal strength of a pilot corresponding to at least one of the base stations through which the mobile station is communicating has fallen below a predetermined level, the mobile station reports the measured signal strength indicative of the corresponding base station to the system controller via the base stations through which it is communicating. Command messages from the system controller to the identified base station and the mobile station terminates communication through the corresponding base station while communications through the other base station or base stations continue.

Although the foregoing techniques are well-suited to call transfers between cells in the same cellular system, a more difficult situation is presented by movement of the mobile station into a cell serviced by a base station from another cellular system. One complicating factor in such "intersystem" handoffs is that a voice link is typically not provided between the base stations of different cellular systems, and hence calls are precluded from being simultaneously maintained through more than one base station during the handoff process. Accordingly, it is often not possible to perform a "soft" intersystem handoff in which the mobile station is concurrently in communication with base stations from more than one system. However, even when the existence of an intersystem voice link creates the potential for soft intersystem handoffs, the often dissimilar characteristics of neighboring cellular systems further complicate the soft handoff process. For example, adjacent cellular systems will often operate at different frequencies, and may maintain different levels of base station output power or pilot strength. These differences effectively preclude the mobile station from performing the pilot strength comparisons and the like contemplated by existing mobile-assisted soft handoff techniques.

When resources are not available to conduct soft intersystem handoffs, the timing of the "hard" handoff of a call or connection from one system to another becomes critical if uninterrupted service is to be maintained. That is, the intersystem handoff must be executed at the time most likely to result in successful transfer of the call or connection between systems. It follows that the handoff should be attempted only when, for example:

(i) an idle channel is available in the new cell, (ii) the mobile station is actually within range of the new cell base station, but before it loses contact with the current cell base station, and (iii) the mobile station is in a position at which it is assured of receiving the command to switch channels.

Ideally, each such "hard" intersystem handoff will be conducted in a manner which minimizes the potential for "ping-ponging" handoff requests between the base stations of different systems. However, this is made difficult as a result of the failure of existing handoff procedures to identify when, and through which base stations, the mobile station should supplied with new frequency and channel information and instructed to transfer the existing call or connection.

These and other shortcomings of existing intersystem handoff techniques impair the quality of cellular communications, and may be expected to further degrade performance as competing cellular systems continue to proliferate. Accordingly, there is a resulting need for an intersystem handoff technique capable of reliably directing the handoff of a call or connection between the base stations of different cellular communication systems.

SUMMARY OF THE INVENTION

The present invention provides a novel and improved method and system for performing a handoff of communication with a mobile station between base stations of different cellular systems. The present invention may be implemented within a cellular communications network in which a mobile station user communicates with another network user via at least a first base station. The network includes first and second mobile switching control stations for respectively controlling communications through the first base station and through a second base station.

In one aspect of the present invention, a technique is provided for directing communication between the mobile and base stations which includes the step of measuring, at the mobile station, a quantifiable parameter (e.g., signal strength) of a signal transmitted by the second base station. When the measured value of the quantifiable parameter passes through a first predetermined level, the mobile station communicates a signal quality message via the first base station to the first mobile switching control station. A channel request message is then communicated from the first mobile switching control station to the second mobile switching control station.

At the second base station, a quantifiable parameter of the signal received from the mobile station is also measured. Upon receiving the channel request message, the second base station establishes communication with the mobile station when the measured value of the quantifiable parameter passes through a predetermined level.

In an implementation of the present invention within a code division multiple access (CDMA) communication system, the signal strength or other quantifiable parameter of a first pilot signal transmitted by the first base station is measured at the mobile station. A handoff request message is then sent to the second base station when the measured signal strength of the first pilot signal becomes less than a second predetermined level. The second base station establishes communication with the mobile station at the time specified by the handoff request message.

In another aspect of the present invention as implemented within a CDMA communication system, a handoff technique is provided which includes the step of measuring, at the mobile station, the signal strength or other quantifiable parameter of a first pilot signal transmitted by a first base station with which the mobile station is currently in communication. In accordance with the invention, the first base station repetitively interrogates said mobile station as to the measured strength of said first pilot. Communication is then established, on an available channel of a second base station within a different cellular system, in accordance with the strength of the first pilot signal measured at the first base station.

In yet another aspect of the present invention, a voice link is provided between first and second mobile switching centers within neighboring cellular systems. The voice link enables a connection with the public switched telephone network to be maintained through the first mobile switching center even after mobile station communication has been transferred to a base station controlled by the second mobile switching center. The provision of a voice link also allows for the execution of "soft" intersystem handoffs. In an exemplary soft intersystem handoff, mobile station communication is simultaneously maintained through the base stations of different cellular systems prior to discontinuation of the initial communication link.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
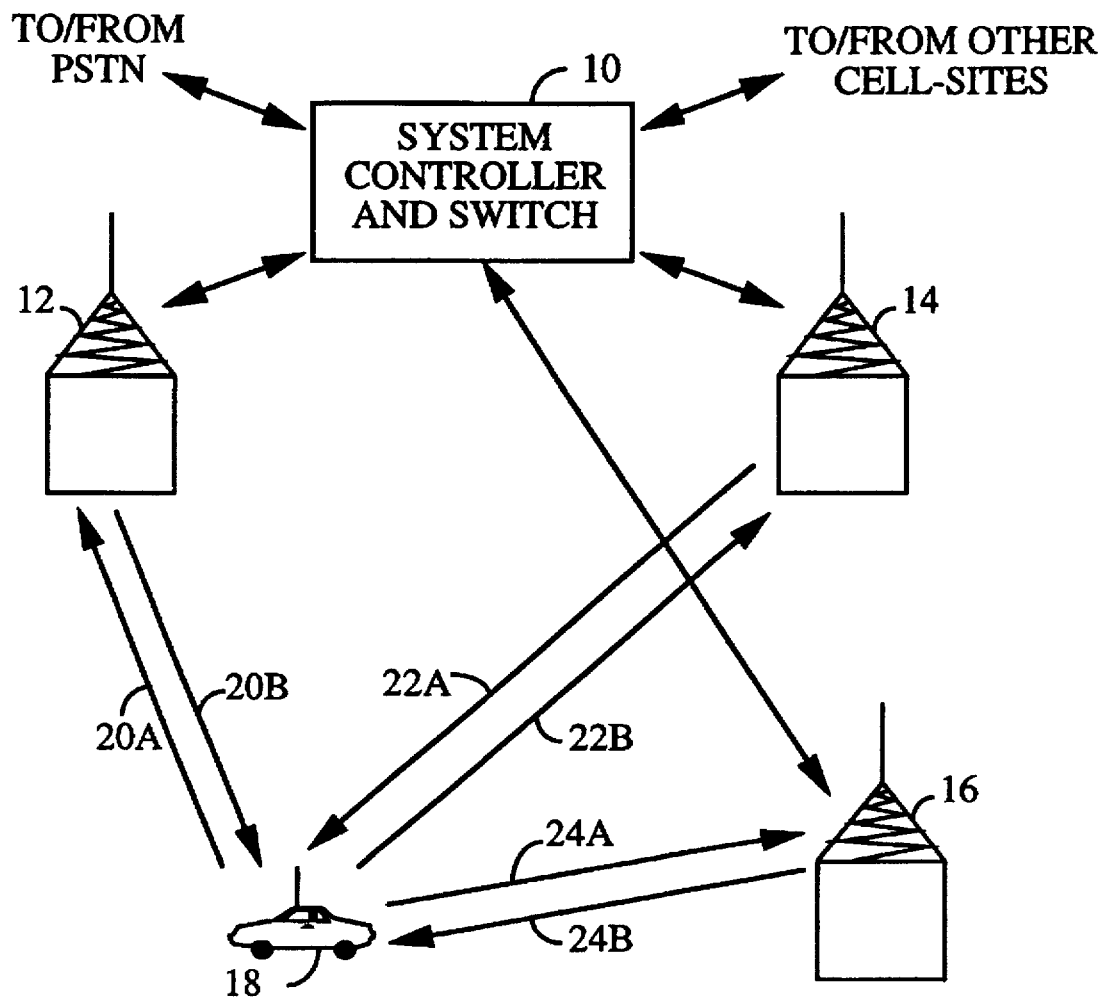
FIG. 1 provides an exemplary illustration of a cellular telephone system, alternately representative of a PBX or PCS system.

An exemplary illustration of a cellular telephone system, alternately representative of a PBX or PCS system, is provided in FIG. 1. The system illustrated in FIG. 1 may utilize various multiple access modulation techniques for facilitating communications between a typically large number of system mobile stations or mobile telephones, and the base stations. A number of multiple access communication system techniques, such as time division multiple access (TDMA), frequency division multiple access (FDMA), code division multiple access (CDMA), and AM modulation schemes such as amplitude companded single sideband are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, which is herein incorporated by reference.

In the above-referenced U.S. Pat. No. 4,901,307, a multiple access technique is disclosed where a large number of mobile telephone system users each having a transceiver communicate through satellite repeaters or terrestrial base stations using CDMA spread spectrum communication signals. In using CDMA communications, the frequency spectrum can be reused multiple times thus permitting an increase in system user capacity. The use of CDMA results in a much higher spectral efficiency than can be achieved using other multiple access techniques.

In the typical CDMA system each base station transmits a unique pilot signal, which comprises the transmission of a "pilot carrier" upon a corresponding pilot channel. The pilot signal is an unmodulated, direct sequence, spread spectrum signal transmitted at all times by each base station using a common pseudorandom noise (PN) spreading code. The pilot signal allows the mobile stations to obtain initial system synchronization, i.e. timing, in addition to providing a phase reference for coherent demodulation and a reference for signal strength measurements used in handoff determination. The pilot signal as transmitted by each base station may often be the same PN spreading code, but with a different code phase offset.

Referring again to FIG. 1, system controller and switch 10, also referred to as a mobile switching center (MSC), typically includes interface and processing circuitry for providing system control to the base stations. Controller 10 also controls the routing of telephone calls from the public switched telephone network (PSTN) to the appropriate base station for transmission to the appropriate mobile station. Controller 10 also controls the routing of calls from the mobile stations, via at least one base station to the PSTN. Controller 10 may direct calls between mobile users via the appropriate base station(s) since such mobile stations do not typically communicate directly with one another.

Controller 10 may be coupled to the base stations by various means such as dedicated telephone lines, optical fiber links or by microwave communication links. In FIG. 1, three such exemplary base stations, 12, 14 and 16 along with an exemplary mobile station 18, which includes a cellular telephone, are illustrated. Arrows 20a–20b define the possible communication link between base station 12 and mobile station 18. Arrows 22a–22b define the possible communication link between base station 14 and mobile station 18. Similarly, arrows 24a–24b define the possible communication link between base station 16 and mobile station 18.

The base station service areas or cells are designed in geographic shapes such that the mobile station will normally be closest to one base station. When the mobile station is idle, i.e. no calls in progress, the mobile station constantly monitors the pilot signal transmissions from each nearby base station. As illustrated in FIG. 1 the pilot signals are transmitted to mobile station 18 by base stations 12, 14 and 16 upon communication links 20b, 22b and 24b, respectively. The mobile station then determines which cell it is in by comparing pilot signal strength transmitted from these particular base stations.

In the example illustrated in FIG. 1, mobile station 18 may be considered closest to base station 16. When mobile station 18 initiates a call, a control message is transmitted to the nearest base station, base station 16. Base station 16 upon receiving the call request message, signals system controller 10 and transfers the call number. System controller 10 then connects the call through the PSTN to the intended recipient.

Should a call be initiated within the PSTN, controller 10 transmits the call information to all the base stations in the area. The base stations in return transmit a paging message to the intended recipient mobile station. When the mobile station hears a page message, it responds with a control message that is transmitted to the nearest base station. This control message signals the system controller that this particular base station is in communication with the mobile station. Controller 10 then routes the call through this base station to the mobile station.

Should mobile station 18 move out of the coverage area of the initial base station, base station 16, an attempt is made to continue the call by routing the call through another base station. In the handoff process there are different methods of initiating the handoff of the call or routing through another base station.

In a base station initiated handoff method, the initial base station, base station 16, notices that the signal transmitted by mobile station 18 has fallen below a certain threshold level. Base station 16 then transmits a handoff request to system controller 10. Controller 10 relays the request to all neighboring base stations, 14, 12 of base station 16. The controller transmitted request includes information relating to the channel, including the PN code sequence used by mobile station 18. Base stations 12 and 14 tune a receiver to the channel being used by the mobile station and measure the signal strength, typically using digital techniques. If one of base stations 12 and 14 receivers report a stronger signal than the initial base station reported signal strength, then a handoff is made to this base station.

Alternately, a "mobile-assisted" handoff may be initiated by the mobile station itself. The mobile station is equipped with a search receiver which is used to scan the pilot signal transmission of neighboring base stations 12 and 14, in addition to performing other functions. If a pilot signal of base stations 12 and 14 is found to be stronger than a given threshold, mobile station 18 transmits a message to the current base station, base station 16. An interactive process between the mobile station and the base station then permits the mobile station to communicate through the one or more of base stations 12, 14 and 16. During this process the mobile station identifies and measures the signal strength of the pilot signals which it receives. This information is communicated via the base station(s) to which the mobile station is communicating through to the MSC. The MSC upon receiving this information then initiates or tears down connections between the mobile and base stations, thereby effecting the mobile assisted handoff.

The foregoing process may also be considered to be a "soft" handoff in that the mobile station simultaneously communicates through more than one base station. During a soft handoff the MSC can combine or choose between the signals received from each base station with which the mobile unit is in communication during movement between different cells. In like manner the MSC may relay signals from the PSTN to each base station with which the mobile unit is in communication. Mobile-assisted handoffs tend to be more complex if the mobile station happens to be located within the coverage area of two or more base stations not within the same cellular system, i.e., not controlled by the same MSC. One approach to performing a mobile-assisted handoff between base stations within different systems will now be described with reference to FIG. 2.

Figure 2:
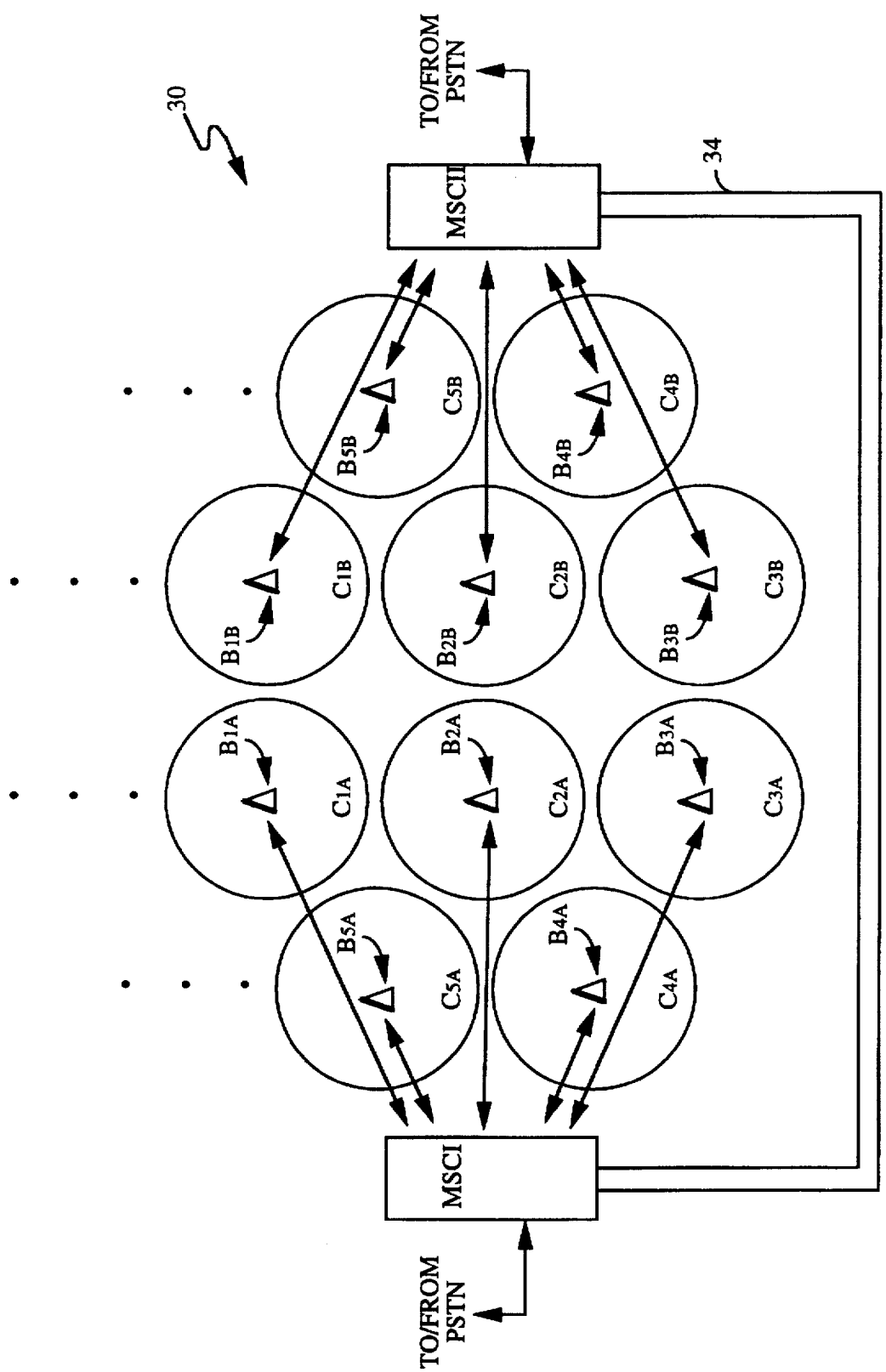
FIG. 2 shows a cellular communications network in which are included first and second cellular systems respectively controlled by first (MSCI) and second (MSCII) mobile switching centers.

Referring to FIG. 2, there is shown a cellular communications network 30 in which are included first and second cellular systems under the control of first and second mobile switching centers, MSCI and MSCII, respectively. MSCI and MSCII are respectively coupled to the base stations of the first and second cellular systems by various means such as dedicated telephone lines, optical fiber links or by microwave communication links. In FIG. 2, there are illustratively represented five such exemplary base stations $B_{1A}$–$B_{5A}$ respectively located within cells $C_{1A}$–$C_{5A}$ of the first system, and five base stations $B_{1B}$–$B_{5B}$ respectively located within the cells $C_{1B}$–$C_{5B}$ of the second cellular system. Although for convenience of illustration the cells $C_{1A}$–$C_{5A}$ and $C_{1B}$–$C_{5B}$ are shown as being circular, it is understood that cells will typically be designed to be of other shapes (e.g., hexagonal). In what follows cells $C_{1A}$–$C_{3A}$ and $C_{1B}$–$C_{3B}$ may be referred to as "border" cells, since these cells are proximate the boundary between the first and second cellular systems. This designation allows the remainder of the cells within each system to be conveniently referred to as "internal" cells.

For present purposes the mobile stations within border cells are assumed to be capable of simultaneously receiving signal energy from base stations within the first and second cellular systems. This will be possible if, for example, the first and second cellular systems operate within the same frequency band. Alternatively, the mobile station could be configured with a dual-band transceiver having a receive chain tuned to the different operating frequencies of the first and second cellular systems. A dual-mode transceiver capable of functioning in this manner is disclosed in copending United States patent application Ser. No. 08/683,004, entitled "MULTIPLE BAND RADIO", filed Sep. 30, 1994, assigned to the assignee of the present invention, the disclosure of which is herein incorporated by reference.

This invention could be used to handoff mobile stations between two systems employing different air interfaces. For example, MSCI may control a CDMA system and MSCII may control an FM analog system. The FM analog system would need to be modified to transmit a pilot signal or other CDMA beacon to initiate the process.

The first mobile switching center (MSCI) controls the routing of telephone calls from the public switched telephone network (PSTN) to the appropriate base station $B_{1A}$–$B_{5A}$ for transmission to the designated mobile station. MSCI also controls the routing of calls from the mobile stations within the coverage area of the first cellular system, via at least one base station, to the PSTN. MSCII operates in a like manner to govern the operation of the base stations $B_{1B}$–$B_{5B}$, and to route calls between the PSTN and the second cellular system. Control messages and the like may be communicated between MSCI and MSCII over an intersystem data link 34 using an industry standard IS-41 protocol as defined in, for example, "EIA/TIA Interim Standard IS-41 Cellular Radio-Telecommunications Intersystem Operations" (Revision B), published by the Telecommunications Industry Association (TIA). See also, "EIA/TIA/TSB-64 IS-41-B Support for Dual-Mode Wideband Spread Spectrum Mobile Stations", also published by the TIA.

When a mobile station is located within an internal cell, the mobile station will typically be programmed to monitor the pilot signal transmissions from each nearby (i.e., internal and/or border) base station. The mobile station then determines which internal cell it is in by comparing pilot signal strength transmitted from the surrounding base stations. When the mobile station approaches the boundary of the internal cell, a mobile-assisted handoff may be initiated in, for example, the manner described above with reference to U.S. Pat. No. 5,267,261.

A different situation exists when the mobile station is located within one of the border cells $C_{1A}$–$C_{3A}$ or $C_{1B}$–$C_{3B}$.

As an example, consider a case in which the mobile station is located within cell $C_{2A}$, but is approaching cell $C_{2B}$. In this instance the mobile station could begin to receive usable signal levels from base station $B_{2B}$, which would then be reported to base station $B_{2B}$ and to any other base station(s) with which the mobile station is currently in communication. The time at which usable signal levels are being received by a mobile or base station may be determined by measuring one or more quantifiable parameters (e.g., signal strength, signal to noise ratio, frame erasure rate, bit error rate, and/or relative time delay) of the received signal. Detection of usable signal is then effected by comparison of the measured parameters to measurements of like parameters of a reference source. After such detection of usable received signal levels at the mobile station, and reporting thereof to base station $B_{2A}$ using a signal strength or quality message, a mobile-assisted handoff from base station $B_{2A}$ to base station $B_{2B}$ could then proceed as follows:

(i) Base station $B_{2A}$ relays the mobile station's reported signal or quality level received from base station $B_{2B}$ to MSCI, which is aware that base station $B_{2B}$ is controlled by MSCII.

(ii) MSCI requests channel resources from MSCII over the data link 34.

(iii) MSCII responds to the request by furnishing information to MSCI, via data link 34, which identifies the channel on which communication is to be established. In addition, the controller within base station $B_{2B}$ reserves the designated channel for communication with the mobile station.

(iv) MSCI supplies the new channel information to the mobile station, and specifies a time at which the mobile station is to begin communication with base station $B_{2B}$.

(v) Communication is established between the mobile station and base station $B_{2B}$ at the specified time, and MSCII assumes control over call routing to/from the mobile station and the PSTN.

One difficulty with this approach is that MSCI is unaware of the exact time at which the signal from the mobile station is received by base station $B_{2B}$ at a sufficient level of strength. This may result in MSCI specifying a premature time at which the mobile station is to establish communication with base station $B_{2B}$. As a consequence, base station $B_{2B}$ may not as yet be receiving a usable signal level from the mobile station, and the call or connection will be dropped during the process of transferring control to MSCII. As is described hereinafter, the present invention contemplates improving the success rate of intersystem handoffs by providing various techniques for identifying the circumstances under which control over a call or connection should be transferred between systems.

I. METHODS OF DIRECT INTERSYSTEM HANDOFF

Method #1

In a first technique contemplated by the invention, the intersystem handoff process initially proceeds in the manner set forth in steps (i)–(iii) above. After receiving the request for channel resources from MSCI, MSCII commands the controller of base station $B_{2B}$ to establish a "reverse link" and acquire the signal transmitted by the mobile station. A quantifiable parameter (e.g., signal strength, signal-to-noise ratio) of the reverse link signal from the mobile station as received at base station $B_{2B}$ is then monitored by MSCII.

In accordance with the invention, MSCII delays sending new channel information to MSCI until a level of the monitored parameter passes through a predetermined threshold. When the monitored parameter corresponds to signal strength, the new channel information is sent when the when measured strength of the mobile station signal exceeds a predetermined signal strength threshold. In this way MSCI is prevented from commanding the mobile station to switch to the new channel until the requisite level of mobile station signal is being received at base station $B_{2B}$.

Method #2

In a second technique, the intersystem handoff process is again initiated as prescribed by steps (i)–(iii). After receiving the request for channel resources from MSCI, MSCII allocates a channel of base station $B_{2B}$ to the mobile station and sends the new channel information to MSCI over the data link 34. In the second technique the mobile station continues to monitor the strength, or other quantifiable parameter, of the pilot signal transmitted by base station $B_{2A}$ and any other base station(s) with which it is in communication. When the energy of one or more of these pilot signals as measured at the mobile station falls below a predefined drop threshold (e.g., T_DROP), the mobile unit informs the MSCI by way of a base station using a standard "T_DROP" message as described in the above-referenced '261 patent.

If the mobile station is in communication with only a single base station within the first cellular system, MSCI will command the mobile station to the new channel upon receiving the T_DROP message. If the mobile unit is in communication with one or more other base stations within the first cellular system from which pilot signal(s) continue to be received with adequate strength, then MSCI may not instruct the mobile station to switch channels until other T_DROP messages are generated indicating a similar fall in pilot strength from the other base stations.

In a variation on the second approach, the T_DROP threshold to which received pilot strength is compared is set higher when the mobile station is in border cells instead of internal cells. As a result, handoff to the base station (e.g., station $B_{2B}$) within the new system occurs earlier than it would were T_DROP set at the nominal level. This increases the likelihood of a successful intersystem handoff, since the call or connection is transferred well before the signal level from the current base station (e.g., base station $B_{2A}$) drops below an unusable level.

Method #3

In a third technique, the intersystem handoff again initially proceeds according to steps (i)–(iii). After receiving the request for channel resources from MSCI, MSCII instructs the controller of base station $B_{2B}$ to allocate a channel to the mobile station. MSCII also sends the new channel information to MSCI over the data link 34. In this approach MSCI repetitively interrogates the mobile station as to the received strength of the pilot signals from base station(s) with which the mobile station is in communication. In response, pilot strength measurement reports are supplied by the mobile station to MSCI through the one or more base station(s) with which the mobile is in communication. The decision on when to command the mobile station to the new channel is made by MSCI on the basis of the pilot strength measurement reports, and is not predicated on predetermined threshold levels (e.g. T_DROP). Factors such as signal to noise ratio, frame erasure rate, and bit error rate may be evaluated in conjunction with signal strength in order to determine when the mobile station should switch to the new channel.

Method #4

In a fourth approach, the intersystem handoff process is again initiated as specified by steps (i)–(iii). After receiving the request for channel resources from MSCI, MSCII commands the controller of base station $B_{2B}$ to allocate a channel to the mobile station and sends the new channel information to MSCI over the data link 34. MSCI then determines the time at which the mobile station is to begin communication with base station $B_{2B}$ based on the distance between the mobile station and a base station in the first cellular system (e.g., station $B_{2A}$) with which the mobile station is currently in communication.

The distance separating the mobile and base stations is determined in an exemplary embodiment by measurement of a round trip signal propagation delay therebetween. In particular, timing information within signals transmitted from the base station is extracted at the mobile station and used to set timing within the mobile station. This aligns timing of the mobile station, offset by the signal propagation delay between the base and mobile stations, to timing at the base station. The desired base-to-mobile station round trip propagation delay may then be determined by comparison of the timing inherent within mobile station transmitted signals received at the base station to the base station's internal timing. Knowledge of neighboring base station locations and propagation conditions therebetween will allow determination of suitable time delay thresholds for initiating handoff.

Method #5

Figure 3:
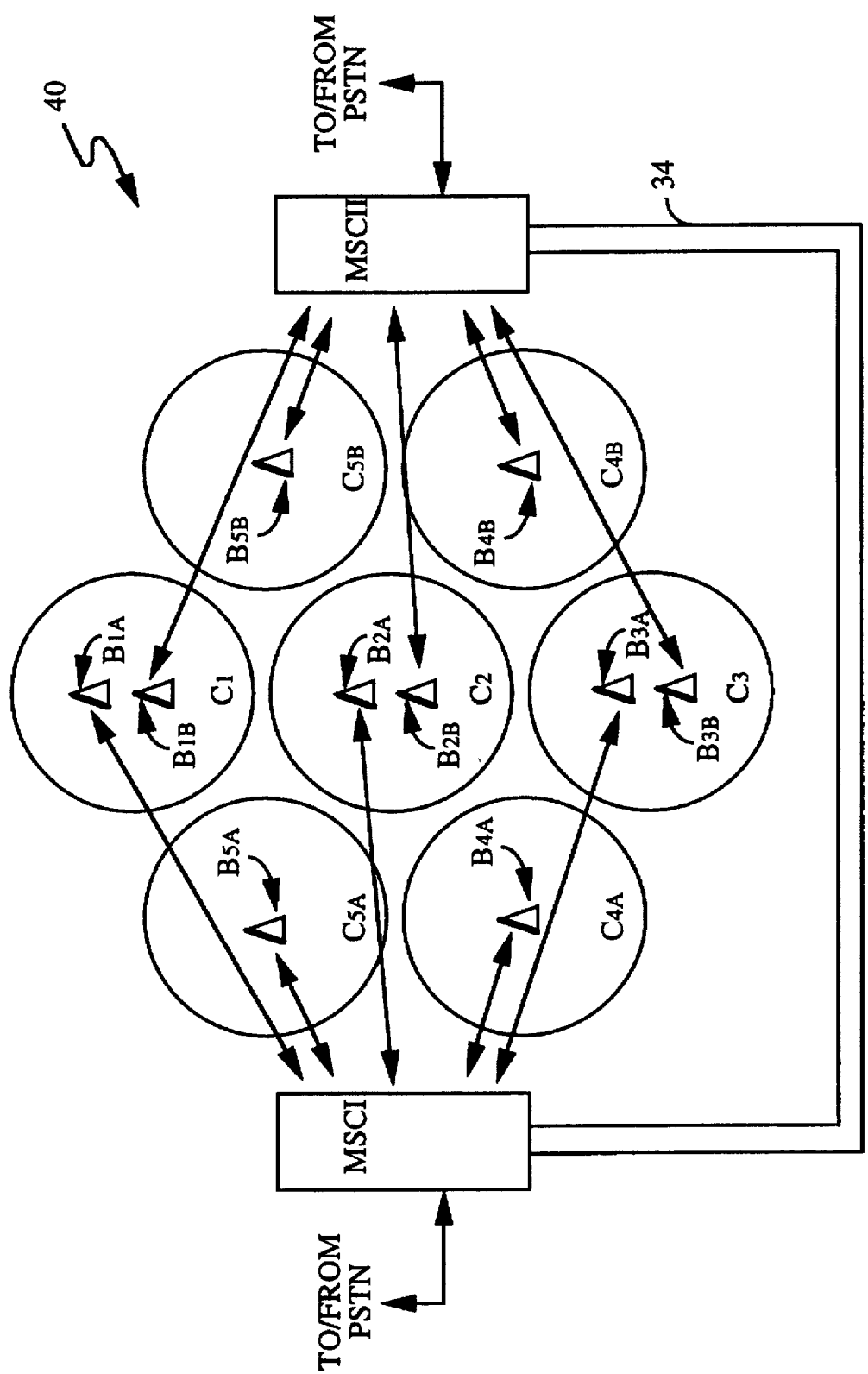
FIG. 3 depicts a cellular communications network in which a coincident set of border cells are shared by first and second cellular systems, wherein each border cell includes first and second co-located base stations respectively associated with the first and second cellular systems.

Referring to FIG. 3, there is shown a cellular communications network 40 in which are included first and second cellular systems under the control of first and second mobile switching centers, MSCI and MSCII, respectively. MSCI and MSCII are respectively coupled to the base stations of the first and second cellular systems by various means such as dedicated telephone lines, optical fiber links or microwave communication links. In FIG. 3, base stations $B_{1A}$–$B_{3A}$ of the first system and base stations $B_{1B}$–$B_{3B}$ of the second system are respectively co-located within border cells C1'–C3', which are represented using dashed lines. Since cells C1'–C3' each include base stations under the control of both MSCI and MSCII, the network of FIG. 3 allows an intersystem handoff to be made at any mobile station location within cells C1'–C3'. The handoff may be "hard" in that communication is established with a base station within the "new" system (e.g., with base station $B_{2B}$) at the same time communication is discontinued with the "current" base station (e.g., base station $B_{2A}$). Alternately, a "soft" intersystem handoff may be performed within the network of FIG. 3 by instructing the mobile station to simultaneously communicate with base stations from the current/new systems prior to discontinuation of the call or connection through the current system. In the preferred embodiment, the cells $B_{2A}$ and $B_{2B}$ are not merely co-located but may actually share certain communications equipment. For example, the cells may use the same antenna(s), receiver low-noise amplifier (LNA), transmitter power amplifier, frequency up/downconverters, and IF subsystems. In addition, certain ones of the channel units (i.e., modems) used in baseband digital processing may be used by MSCI, while the remaining channel units could be dedicated to MSCII.

In accordance with another aspect of the invention, various types of soft intersystem handoffs are made possible by the co-location of border base stations within the network of FIG. 3. As an example, after receiving the request for channel resources from MSCI as prescribed by Method #1, MSCII would command base station $B_{2B}$ to establish a "reverse link" and acquire the signal transmitted by the mobile station. The strength, or other quantifiable parameter, of the reverse link signal from the mobile station as received at base station $B_{2B}$ would again be monitored by MSCII.

MSCII could then again delay sending new channel information to MSCI until the strength of the reverse link signal exceeded a predetermined threshold level. At this point a soft handoff would be initiated by simultaneously establishing communication with the mobile station through both base station $B_{2A}$ and $B_{2B}$. MSCI would then be free to complete the handoff by discontinuing the connection with the mobile station at any time thereafter.

II. INTERSYSTEM HANDOFF USING OPTIONAL VOICE LINK

Intersystem Forwarding

Figure 4:
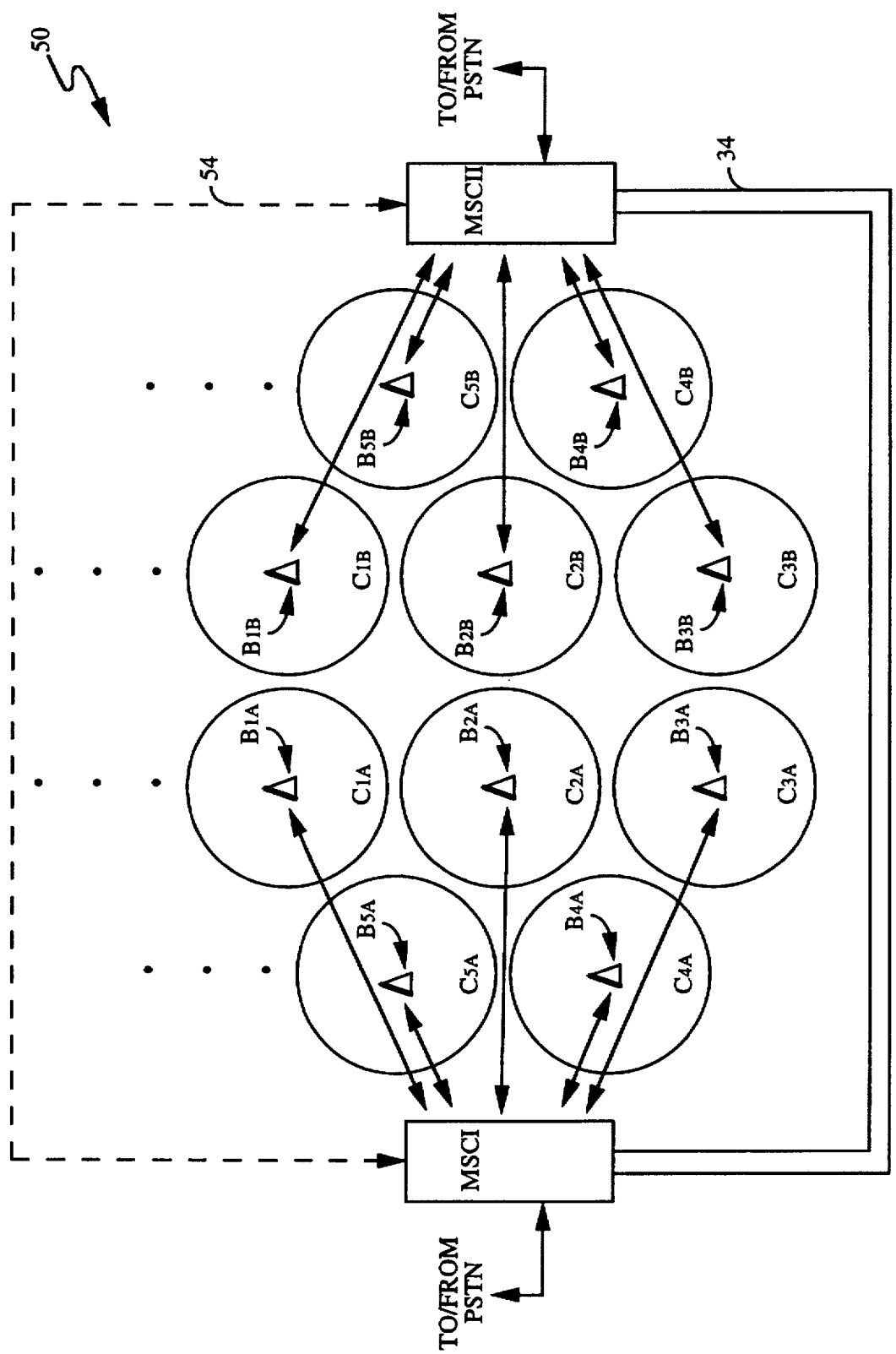
FIG. 4 shows a cellular communications network in which are included first and second cellular systems, respectively controlled by first (MSCI) and second (MSCII) mobile switching centers, and connected by both intersystem voice and data links.

Turning now to FIG. 4, a block diagram is provided of a cellular communications network 50 in which are included first and second cellular systems under the control of first and second mobile switching centers, MSCI and MSCII, respectively. The communications network 50 is substantially identical to the network 30 (FIG. 2), with the exception that a voice link 54 is seen to exist between the switching centers MSCI and MSCII in addition to the IS-41 standard data link 34.

In accordance with the invention, the voice link 54 allows voice communication to be routed from MSCII to/from the PSTN via MSCI after the call or connection has been handed off from the first to the second system. For example, after communication with the mobile station has been transferred from base station $B_{2A}$ to station $B_{2B}$ using any of the foregoing techniques, the existing connection with the PSTN through MSCI would be maintained instead of a new PSTN connection being established by MSCII. Voice information could then be relayed to/from the PSTN and MSCII by way of MSCI and the voice link 54.

As used herein, the term "voice link" is representative of the communication service typically provided a cellular telephone system, i.e., wireless voice telephony. Those skilled in the art will appreciate that the voice link 54 may be established by various means, such as by using dedicated telephone lines, optical fiber links, or microwave communication links. However, given the applicability of the teachings of the invention to forms of communication other than wireless telephony, it is understood that the term voice link should be construed as encompassing a variety of communication modes familiar to those skilled in the art (e.g., digital data, packet data, facsimile transmission, paging, dispatch messages, and video data).

Intersystem Soft Handoff Using Voice Link

In addition to allowing a PSTN connection to be forwarded between systems, the voice link 54 (FIG. 4) enables execution of soft intersystem handoffs. As an example, consider the case in which an intersystem handoff is contemplated between base station $B_{2A}$ and base station $B_{2B}$. Next, assume that the decision to handoff communication to base station $B_{2B}$ has been made using any of the foregoing techniques (e.g., Methods #1–5). At this point communication is established with the mobile station through base station $B_{2B}$, but communication is not simultaneously discontinued through base station $B_{2A}$. Instead, the connection with the PSTN is maintained through MSCI, and voice communication is relayed to/from the PSTN and base station $B_{2B}$ by way of the voice link 54 and MSCII. In accordance with the invention, MSCI may then combine or choose between the signals from base stations $B_{2A}$ and $B_{2B}$ for transmission to the PSTN.

At some time later it may be desired to complete the intersystem handoff, which involves discontinuing communication through base station $B_{2A}$ while maintaining communication through base station $B_{2B}$. In this situation the existence of the voice link 54 allows the established connection with the PSTN to be maintained, even after communication with the mobile station through base station $B_{2A}$ has been discontinued. Alternately, completion of the intersystem handoff could be effected by tearing down the connection with the PSTN through MSCI, and simultaneously establishing a new PSTN connection through MSCII. The new PSTN connection through MSCII would typically be established contemporaneously with, or shortly after, discontinuation of communication through base station $B_{2A}$.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. For example, although the present invention has been described within the context of a CDMA communication system, the intersystem handoff techniques described herein are equally applicable to other types of cellular systems (e.g., TDMA, FDMA). Thus, the present invention is not intended to be limited to the embodiments shown herein but is to be accorded the widest scope consistent with the principles and novel features disclosed herein.

We claim:

1. In a cellular communications network in which a network user communicates through a mobile station with another network user via at least a first base station, said network including first and second mobile switching control stations for respectively controlling communications through said first base station connected to said first switching control station and through a second base station connected to said second switching control station, a method for directing communications between said mobile station user and said first and second base stations comprising the steps of:

measuring, at said mobile station, a first quantifiable parameter of a signal transmitted by said second base station;

communicating a signal quality message, from said mobile station via said first base station to said first mobile switching control station, when the measured value of said first quantifiable parameter passes through a first predefined threshold;

communicating a channel request message from said first mobile switching control station to said second mobile switching control station;

measuring, at said second base station, a second quantifiable parameter of a signal transmitted by said mobile station; and establishing, at said second base station in response to said channel request message, communication with said mobile station when a measured value of said second quantifiable parameter passes through a second predefined threshold.

2. The method of claim 1 wherein said step of establishing communication at said second base station includes the step of assigning an available channel of said second base station to said mobile station.

3. The method of claim 2 wherein said first and second quantifiable parameters correspond to signal strength, and wherein said step of establishing communication includes the step of forwarding said available channel assignment from said second mobile switching control station to said first mobile switching control station.

4. The method of claim 1 further comprising the step of terminating communication from said first base station to said mobile station.

5. In a code division multiple access (CDMA) cellular communications network in which a user of a mobile station communicates with another network user via at least a first base station using spread spectrum communication signals, said network including first and second mobile switching control stations for respectively controlling communications through said first base station connected to said first switching control station and through a second base station connected to said first switching control station, a method for directing communications between said mobile station user and said first and second base stations comprising the steps of:

measuring, at said mobile station, signal strength of a second pilot signal transmitted by said second base station;

communicating a signal strength message, from said mobile station via said first base station to said first mobile switching control station, when measured signal strength of said second pilot signal exceeds a first predetermined level;

communicating a channel request message from said first mobile switching control station to said second mobile switching control station;

assigning, in response to said channel request message, an available channel of said second base station to said mobile station;

measuring, at said mobile station, signal strength of a first pilot signal transmitted by said first base station; and sending a handoff request message to said second base station when measured signal strength of said first pilot signal becomes less than a second predetermined level.

6. The method of claim 5 further including the step of establishing, at said second base station in response to said handoff request message, communication with said mobile station.

7. The method of claim 5 further comprising the step of terminating communication from said first base station to said mobile station.

8. In a cellular communications network in which a user of a mobile station communicates with another network user via at least a first base station, said network including first and second mobile switching control stations for respectively controlling communications through said first base station connected to said first switching control station and through a second base station connected to said second switching control station, a method for directing communications between said mobile station user and said first and second base stations comprising the steps of:

measuring, at said mobile station, signal strength of a second pilot signal transmitted by said second base station;

communicating a signal strength message, from said mobile station via said first base station to said first mobile switching control station, when measured signal strength of said second pilot signal exceeds a first predetermined level;

communicating a channel request message from said first mobile switching control station to said second mobile switching control station;

assigning, in response to said channel request message, an available channel of said second base station to said mobile station;

measuring, at said mobile station, the signal strength of a first pilot transmitted by said first base station;

repetitively interrogating said mobile station through said first base station as to the measured strength of said first pilot;

establishing, at said second base station on said available channel, communication with said mobile station in accordance with said measured strength of said first pilot.

9. The method of claim 8 wherein said step of establishing communication includes the steps of:

instructing said first base station to request that said mobile station provide a pilot measurement report indicative at least of said measured pilot strength, and sending a call handoff request to said second base station based upon said pilot measurement report.

10. The method of claim 8 further comprising the step of monitoring a mobile unit response to said repetitive interrogation through said second base station.

11. In a cellular communications network in which a user of a mobile station communicates with another network user via at least a first base station, said network including first and second mobile switching control stations for respectively controlling communications through said first base station connected to said first switching control station and through a second base station connected to said second switching control station, a method for directing communications between said mobile station user and said first and second base stations comprising the steps of:

measuring, at said mobile station, signal strength of a pilot signal transmitted by said second base station;

communicating a signal strength message, from said mobile station via said first base station to said first mobile switching control station, when measured signal strength of said second pilot signal exceeds a first predetermined level;

communicating a channel request message from said first mobile switching control station to said second mobile switching control station;

assigning an available channel of said second base station to said mobile station in response to said channel request message;

measuring distance between said mobile station and said first base station based on propagation delay of said pilot signal transmitted by said first base station; and establishing communication with said mobile station on said available channel of said second base station when measured distance between said mobile station and said first base station exceeds a predefined distance.

12. The method of claim 11 wherein said step of establishing communication includes the step of sending a handoff request message from said first mobile switching control station to said second base station via said second mobile switching control station upon said measured distance exceeding said predefined distance.

13. In a cellular communications network in which a user of a mobile station communicates with another network user via at least a first border base station included within a first set of base stations, said network including first and second mobile switching control stations for respectively controlling communications through said first and a second set of base stations, said first set of base stations including a number of border base stations adjacent said second set of base stations, a method for directing communications between said mobile station user and said first and second sets of base stations comprising the steps of:

measuring, at said mobile station, signal strength of a second pilot signal transmitted by a second base station of said second set of base stations;

communicating a signal strength message, from said mobile station via said first base station to said first mobile switching control station, when measured signal strength of said second pilot signal exceeds a first predetermined level;

communicating a channel request message from said first mobile switching control station to said second mobile switching control station;

assigning, in response to said channel request message, an available channel of said second base station to said mobile station;

measuring, at said mobile station, signal strength of a first pilot signal transmitted by said first base station; and sending a handoff request message to said second base station when measured signal strength of said first pilot signal becomes less than a predetermined border drop threshold wherein said predetermined border drop threshold exceeds a nominal drop threshold to which measured signal strength of pilot signals from base stations other than said border base stations are compared when determining whether to send other handoff request messages.

14. In a cellular communications network in which information signals are communicated between a user of a mobile station and another network user communicate via at least a first base station, said network including first and second mobile switching control stations for respectively controlling communications through said first base station connected to said first switching control station and through a second base station connected to said second switching control station, a system for directing communications between said mobile station user and said first and second base stations comprising:

a mobile station signal strength measurement circuit for measuring, at said mobile station, strength of a signal transmitted by said second base station;

a first communication link for communicating a signal strength message, from said mobile station via said first base station to said first mobile switching control station, when measured signal strength of said signal transmitted by said second base station exceeds a first predetermined level;

a second communication link for relaying at least a channel request message from said first mobile switching control station to said second mobile switching control station, said first mobile switching control station including means for generating said channel request message; and a base station signal strength measurement circuit for measuring, at said second base station, signal strength transmitted by said mobile station wherein said second mobile switching control station includes a controller for establishing communication with said mobile station via said second base station in accordance with said channel request message when said measured strength of said mobile station signal exceeds a predetermined threshold.

15. The system of claim 14 wherein said second base station includes a base station controller for assigning an available channel of said second base station to said mobile station.

16. The system of claim 15 wherein said base station controller includes means for providing an available channel assignment message to said first mobile switching control station, said available channel message being forwarded to said second mobile switching control station from said first mobile switching control station over said first communication link.

17. In a code division multiple access (CDMA) cellular communications network in which spread spectrum information signals are communicated between a user of a mobile station and another network user via at least a first base station, said network including first and second mobile switching control stations for respectively controlling communications through said first base station connected to said first switching control station and through a second base station connected to said first switching control station, a system for directing communications between said mobile station user and said first and second base stations comprising:

a mobile station signal strength measurement circuit for measuring signal strength of first and second pilot signals transmitted by said first and second base stations, respectively;

means for communicating a signal strength message, from said mobile station via said first base station to said first mobile switching control station, when measured signal strength of said second pilot signal exceeds a first predetermined level;

a first communication link for relaying at least a channel request message from said first mobile switching control station to said second mobile switching control station, said first mobile switching control station including means for generating said channel request message;

a base station controller for assigning, in response to said channel request message, an available channel of said second base station to said mobile station, said first mobile switching control station including means for sending a handoff request message to said second base station when measured signal strength of said first pilot signal becomes less than a second predetermined level.

18. The system of claim 17 wherein said second mobile switching control station includes means for establishing, at said second base station in response to said handoff request message, communication with said mobile station.

19. In a code division multiple access (CDMA) cellular communications network in which spread spectrum information signals are communicated between a user of a mobile station and another network user via at least a first base station, said network including first and second mobile switching control stations for respectively controlling communications through said first base station connected to said first switching control station and through a second base station connected to said second switching control station, a system for directing communications between said mobile station user and said first and second base stations comprising:

a mobile station signal strength measurement circuit for measuring signal strength of first and second pilot signals transmitted by said first and second base stations, respectively;

means for communicating a signal strength message, from said mobile station via said fist base station to said first mobile switching control station, when measured signal strength of said second pilot signal exceeds a first predetermined level;

a first communication link for relaying at least a channel request message from said fist mobile switching control station to said second mobile switching control station, said first mobile switching control station including means for generating said channel request message;

a base station controller for assigning, in response to said channel request message, an available channel of said second base station to said mobile station wherein said first mobile switching control station includes means for repetitively interrogating said mobile station as to the measured strength of said first pilot;

whereby said second mobile switching control station operates to establish communication with said mobile station on said available channel when said measured pilot strength of said first base station becomes less than a second threshold.

20. The system of claim 19 wherein said first mobile switching control station includes:

means for requesting, via said first base station, that said mobile station provide a pilot measurement report to said first base station indicative at least of said measured pilot strength from said first base station, and means for sending a call handoff request to said second mobile switching control station via said first communication link based upon said pilot measurement report.

21. In a code division multiple access (CDMA) cellular communications network in which spread spectrum information signals are communicated between a mobile station user and another network user via at least a first base station, said network including first and second mobile switching control stations for respectively controlling communications through said first base station connected to said first switching control station and through a second base station connected to said first switching control station, a system for directing communications between said mobile station user and said first and second base stations comprising:

a mobile station signal strength measurement circuit for measuring signal strength of pilot signals transmitted by said first and second base stations;

means for communicating a signal strength message, from said mobile station via said first base station to said first mobile switching control station, when measured signal strength of said second pilot signal exceeds a first predetermined level;

a first communication link for relaying at least a channel request message from said first mobile switching control station to said second mobile switching control station, said first mobile switching control station including means for generating said channel request message;

a base station controller for assigning an available channel of said second base station to said mobile station in response to said channel request message; and means for measuring distance between said mobile station and said first base station based on propagation delay of said pilot signal transmitted by said first base station, said first mobile switching control station including means for establishing communication with said mobile station on said available channel of said second base station when measured distance between said mobile station and said first base station exceeds a predefined distance.

22. The system of claim 21 wherein said first mobile switching control station includes means for sending a handoff request message to said second base station via said second mobile switching control station upon said measured distance exceeding said predefined distance.

23. The system of claim 22 further including a second communication link for conveying said user information signals between said first and second mobile switching control stations.

24. The system of claim 23 wherein said second mobile switching control station includes means for relaying, via said second communication link, user information signals between said first mobile switching control station and said second base station, thereby allowing said mobile station user to simultaneously communicate with another network user through said first and second base stations.

25. In a cellular communications network in which a mobile station user communicates over a first frequency band with another network user via at least a first base station, said network including first and second mobile switching control stations for respectively controlling communications through said first base station connected to said first switching control station and through a second base station connected to said second switching control station, a method for directing communications between said mobile station user and said first and second base stations comprising the steps of:

measuring, at said mobile station, strength of a signal transmitted over a second frequency band by said second base station;

communicating a signal strength message, from said mobile station via said first base station to said first mobile switching control station, when measured signal strength of said signal transmitted by said second base station exceeds a first predetermined level;

communicating a channel request message from said first mobile switching control station to said second mobile switching control station;

measuring, at said second base station, signal strength transmitted by said mobile station; and establishing, at said second base station in response to said channel request message, communication with said mobile station when measured strength of said mobile station signal exceeds a predetermined threshold.

26. In a cellular communications network in which a mobile station user communicates over a first frequency band with another network user via at least a first base station, said network including first and second mobile switching control stations for respectively controlling communications through said first base station connected to said first switching control station and through a second base station connected to said first switching control station, a method for directing communications between said mobile station user and said first and second base stations comprising the steps of:

measuring, at said mobile station, strength of a signal transmitted over a second frequency band by said second base station;

communicating a signal strength message, from said mobile station via said first base station to said first mobile switching control station, when measured signal strength of said signal transmitted by said second base station exceeds a first predetermined level;

communicating a channel request message from said first mobile switching control station to said second mobile switching control station;

assigning, in response to said channel request message, an available channel of said second base station to said mobile station;

measuring, at said mobile station, strength of a first signal transmitted within a first frequency band by said first base station; and sending a handoff request message to said second base station when measured strength of said signal transmitted by said first base station becomes less than a second predetermined level.

27. In a cellular communications network in which a mobile station user communicates with another network user via at least a first base station, said network including first and second mobile switching control stations for respectively controlling communications through said first base station connected to said first switching control station operative over a first frequency band and through a second base station connected to said second switching control station operative over a second frequency band, a method for directing communications between said mobile station user and said first and second base stations comprising the steps of:

measuring, at said mobile station, signal strength of a pilot signal transmitted by said second base station within said second frequency band;

communicating a signal strength message within said first frequency band, from said mobile station via said first base station to said first mobile switching control station, when measured signal strength of said second pilot signal exceeds a first predetermined level;

communicating a channel request message from said first mobile switching control station to said second mobile switching control station;

measuring, at said second base station, signal strength transmitted by said mobile station within said second frequency band; and establishing, at said second base station in response to said channel request message, communication with said mobile station over said second frequency band when measured strength of said mobile station signal exceeds a predetermined threshold.

28. In a cellular communications network in which information signals are communicated between a mobile station user and another network user via at least a first base station operative over a first frequency band, said network including first and second mobile switching control stations for respectively controlling communications through said first base station connected to said first switching control station and through a second base station connected to said second switching control station operative over a second frequency band, a system for directing communications between said mobile station user and said first and second base stations comprising:

a mobile station signal strength measurement circuit for measuring signal strength of a pilot signal transmitted by said second base station within said second frequency band;

a dual-band mobile station transceiver for communicating a signal strength message within said first frequency band to said first base station when measured signal strength of said second pilot signal exceeds a first predetermined level;

a first communication link for relaying at least a channel request message from said first mobile switching control station to said second mobile switching control station, said first mobile switching control station including means for generating said channel request message; and a base station signal strength measurement circuit for measuring, at said second base station, signal strength transmitted by said mobile station transceiver wherein said second mobile switching control station includes means for establishing communication with said mobile station via said second base station in accordance with said channel request message when said measured strength of said mobile station signal transmitted within said second frequency band exceeds a predetermined threshold.

29. In a cellular communications network in which a mobile station user communicates with another network user via at least a first base station, said network including first and second mobile switching control stations for respectively controlling communications through said first base station connected to said first switching control station and through a second base station connected to said second switching control station, a method for directing communications between said mobile station user and said first and second base stations comprising the steps of:

measuring, at said mobile station, strength of a signal transmitted by said second base station;

communicating a signal strength message, from said mobile station via said first base station to said first mobile switching control station, when measured strength of said signal transmitted by said second base station exceeds a first predefined threshold;

communicating a channel request message from said first mobile switching control station to said second mobile switching control station;

measuring, at said second base station, strength of a signal transmitted by said mobile station; and establishing, at said second base station in response to said channel request message, communication with said mobile station when measured strength of said signal transmitted by said mobile station exceeds a second predefined threshold.

* * * * *